United States Patent
Lin et al.

(10) Patent No.: US 6,731,365 B2
(45) Date of Patent: May 4, 2004

(54) ARRAY CIRCUIT OF A LIQUID CRYSTAL DISPLAY WHEREIN COMMON ELECTRODES ISOLATED EACH OTHER IN DIFFERENT PIXEL REGIONS

(75) Inventors: Sheng-Hsien Lin, Tainan Hsien (TW); Po-Sheng Shih, Hsinchu (TW)

(73) Assignee: Hannstar Display Corp., Taipei (TW)

(*) Notice: Subject to any disclaimer, the term of this patent is extended or adjusted under 35 U.S.C. 154(b) by 176 days.

(21) Appl. No.: 10/008,847

(22) Filed: Nov. 30, 2001

(65) Prior Publication Data

US 2002/0180899 A1 Dec. 5, 2002

(30) Foreign Application Priority Data

May 29, 2001 (TW) .......................... 90112892 A

(51) Int. Cl.[7] .......................... G02F 1/1343; G09G 3/36
(52) U.S. Cl. .......................... 349/143; 349/141; 349/39; 345/87; 345/90
(58) Field of Search .................. 349/143, 141, 349/38, 171, 39; 345/87, 90

(56) References Cited

U.S. PATENT DOCUMENTS

| | | | | |
|---|---|---|---|---|
| 4,728,172 A | * | 3/1988 | Cannella | 350/332 |
| 4,728,175 A | * | 3/1988 | Baron | 350/336 |
| 6,177,988 B1 | * | 1/2001 | Dubnack et al. | 349/38 |
| 2001/0052951 A1 | * | 12/2001 | Ashizawa et al. | 349/43 |

FOREIGN PATENT DOCUMENTS

JP 2000-305063 11/2000

* cited by examiner

Primary Examiner—Robert H. Kim
Assistant Examiner—Mike Qi
(74) Attorney, Agent, or Firm—Rabin & Berdo

(57) ABSTRACT

An array structure of a liquid crystal display is provided, comprising a substrate having a first and a second pixel region thereon. Each of the pixel regions has a transistor, a pixel electrode electrically connected to a drain of the transistor, and a common electrode forming a capacitance with the pixel electrode, wherein the common electrodes of the first and second pixel regions are electrically isolated from each other.

16 Claims, 6 Drawing Sheets

ARRAY CIRCUIT OF A LIQUID CRYSTAL DISPLAY WHEREIN COMMON ELECTRODES ISOLATED EACH OTHER IN DIFFERENT PIXEL REGIONS

BACKGROUND OF THE INVENTION

1. Field of the Invention

The present invention relates to a liquid crystal display, particularly to an array structure of a liquid crystal display having two common electrodes.

2. Description of the Prior Art

FIG. 1 is a diagram showing a conventional array structure of a liquid crystal display. There are four pixel regions on a substrate 10. Each scan line 102 is electrically connected to gates of transistors 101 in one line of pixel regions through via holes (not shown). Each data line 103 is electrically connected to sources of the transistors 101 in one row of pixel regions through via holes. Each pixel electrode 201 has a connector 2011 electrically connected to drains of the transistors 101 and extended portions 2012 extending from the connector 2011. A common electrode 104 has connectors 1041 along with the lines of the pixel regions and extended portions 1042 extending from the connectors 1041. The transistors 101 are positioned where the extended portions 1042 extend from the connectors 1041 of the common electrode 104. Capacitances are formed between the extended portions 2012 and 1042 respectively of the pixel electrodes 201 and the common electrode 104.

FIG. 2 is a diagram showing an equivalent circuit of the conventional transistor array of the liquid crystal display. The same symbols are used in FIG. 1 and FIG. 2. The circuit comprises the transistors 101, the scan lines 102 connected to the gates of lines of the transistors 101, the data lines connected to the sources of rows of the transistors 101, the common electrode 104 and the capacitances 105 formed between the drains of the transistors 101 and the common electrodes 104.

However, all the pixel regions of the conventional transistor array structure have the same common electrode voltage since they have the same common electrode. It is impossible to apply two different common electrode voltages to the pixel regions. Thus, any driving method using two different common electrode voltages cannot be implemented by a conventional circuit.

SUMMARY OF THE INVENTION

Therefore, the object of the present invention is to provide an array structure of a liquid crystal display having two common electrodes isolated from each other.

The other object of the present invention is to provide two different driving voltages to drive the two isolated common electrode in the array structure. The two different driving voltages comprise a positive and negative voltage.

The present invention provides an array structure of a liquid crystal display. The circuit comprises a substrate having a first and a second pixel region thereon. Each of the pixel regions has a transistor, a pixel electrode electrically connected to a drain of the transistor and a common electrode forming a capacitance with the pixel electrode, wherein the common electrodes of the first and second pixel regions are electrically isolated from each other.

The present invention further provides an array structure of a liquid crystal display comprising a substrate having a first and a second pixel region thereon. Each of the pixel regions has a transistor, a pixel electrode electrically connected to a drain of the transistor, and a common electrode having an extended portion forming a capacitance with the pixel electrode and a connector which the extended portion extends from, wherein the common electrodes of the first and second pixel regions are isolated from each other, and the transistors are positioned where the extended portions extending from the connectors.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE INVENTION

Figure 1:
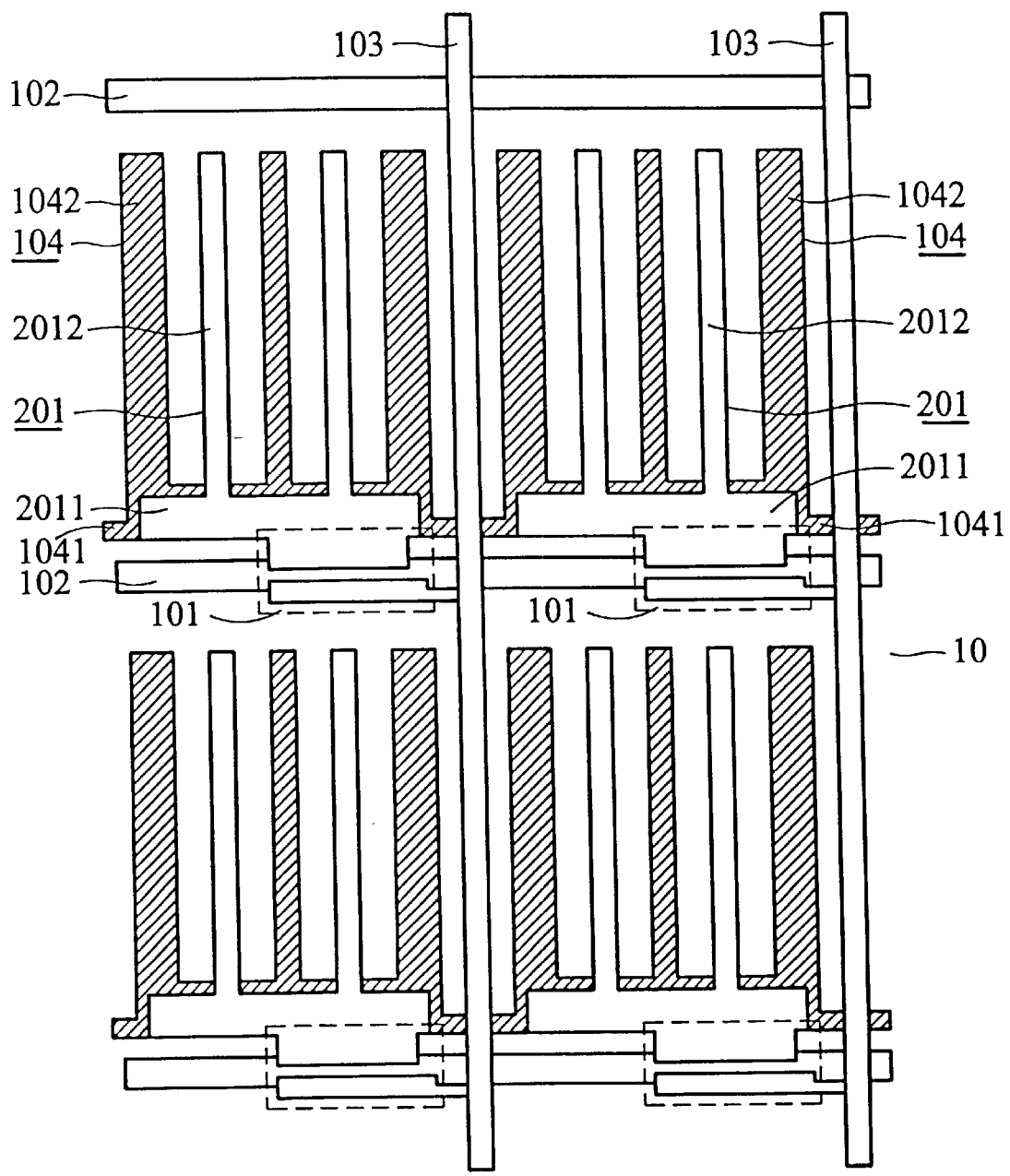
FIG. 1 is a diagram showing a conventional array structure of a liquid crystal display.
Figure 2:
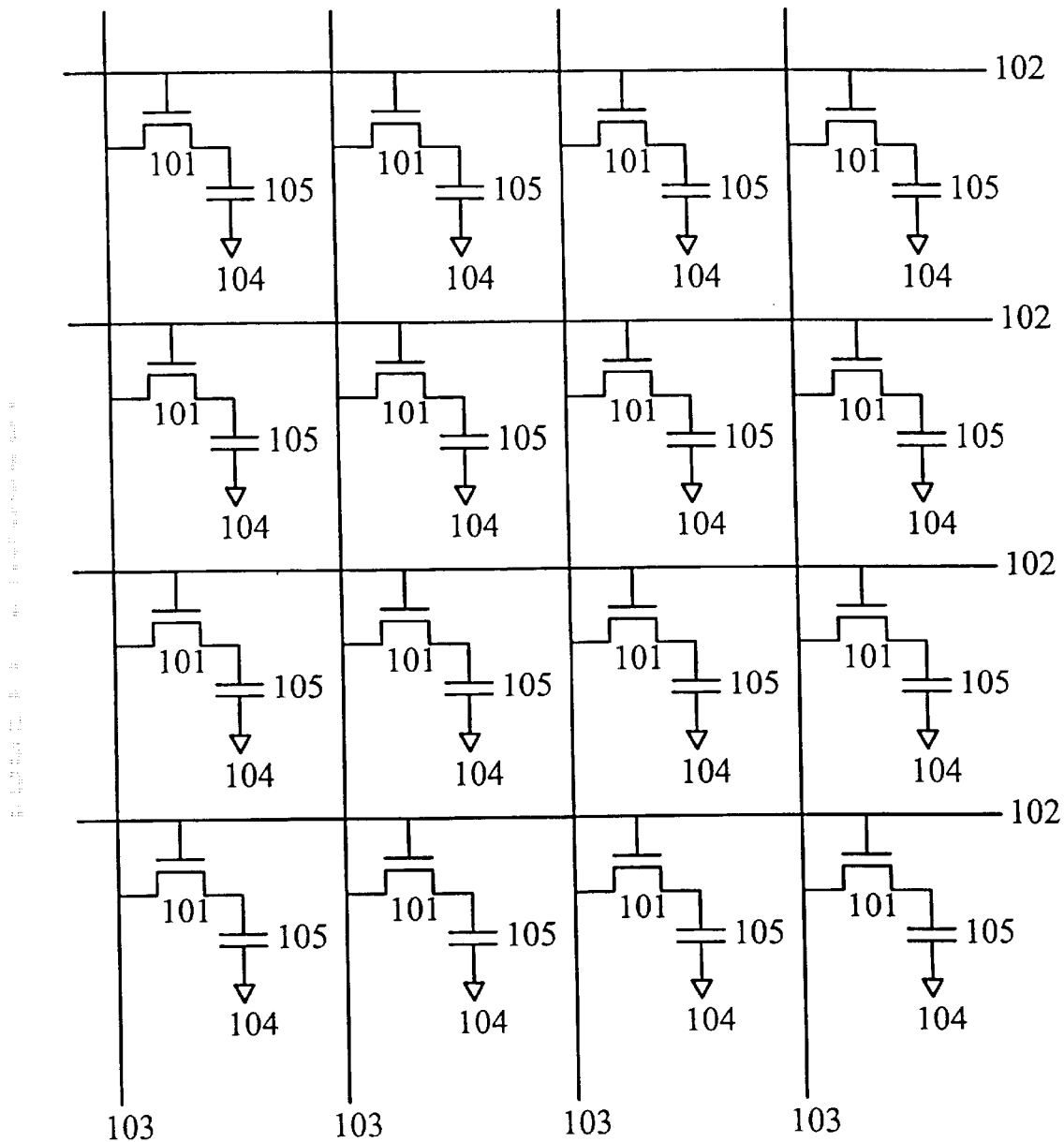
FIG. 2 is a diagram showing an equivalent circuit of the conventional transistor array of the liquid crystal display.
Figure 3:
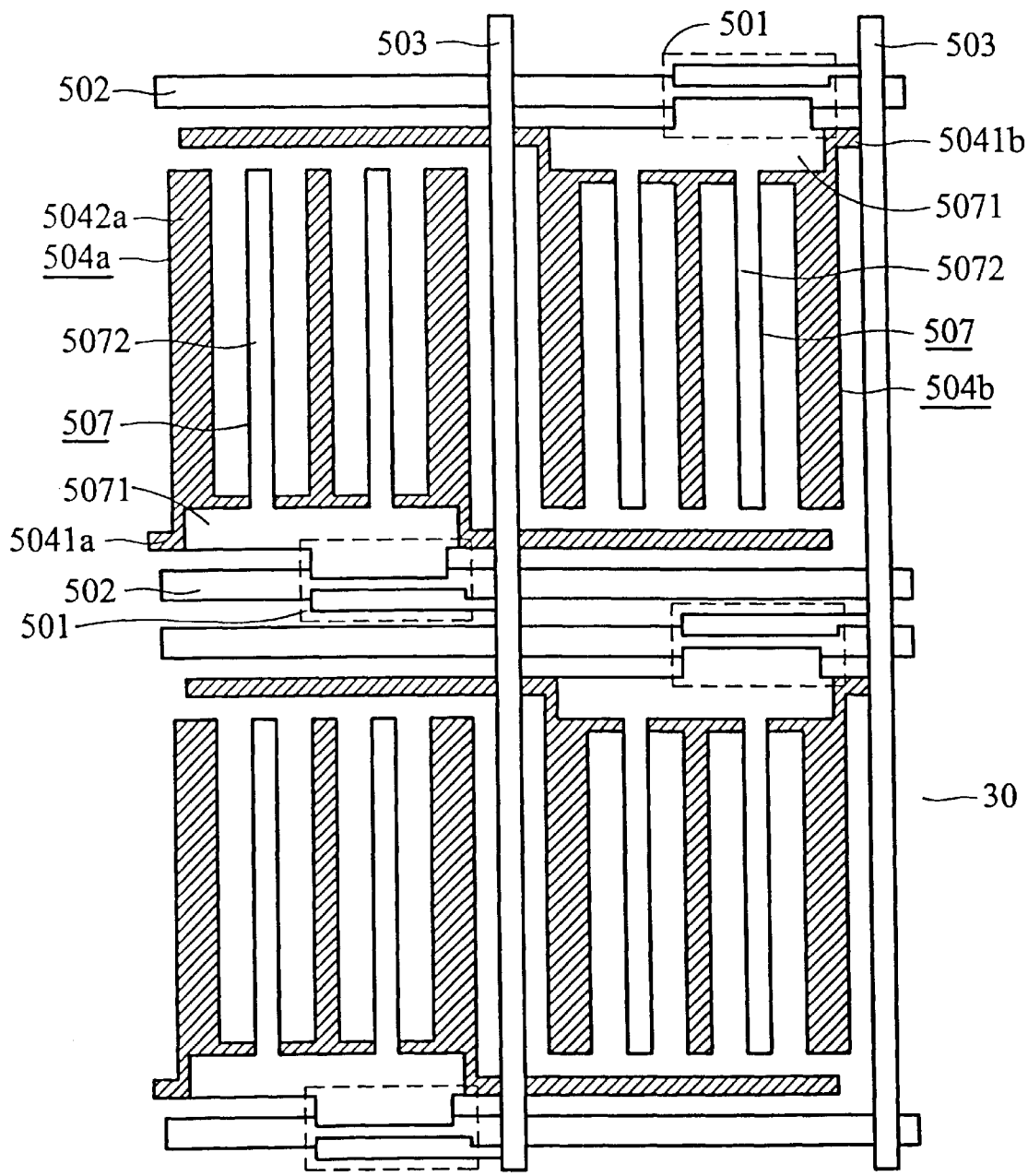
FIG. 3 is a diagram showing an array structure of a liquid crystal display according to a first embodiment of the invention.

FIG. 3 is a diagram showing an array structure of a liquid crystal display according to a first embodiment of the invention.

There are at least four pixel regions as a unit on a substrate 30. There are two electrically connected scan lines 502 for each line of pixel regions, which are also electrically connected to gates of transistors 501 in the line through via holes (not shown). Each data line 503 is electrically connected to sources of the transistors 501 in one row of pixel regions through via holes. Each pixel electrode 507 has a connector 5071 electrically connected to drains of the transistors 501 and extended portions 5072 extending from the connector 5071. Two common electrodes 504a and 504b, isolated from each other, are provided, and have connectors 5041a and 5041b along with the lines of the pixel regions and extended portions 5042a and 5042b extending from the connectors 5041a and 5041b, respectively. The transistors 501 are positioned where the extended portions 5042a and 5042b extend from the connectors 5041a and 5041b of the common electrodes 504a and 504b. Capacitances are formed between the extended portions 5072, 5042a and 5042b, respectively of the pixel electrodes 507 and the common electrodes 504a and 504b.

Figure 4:
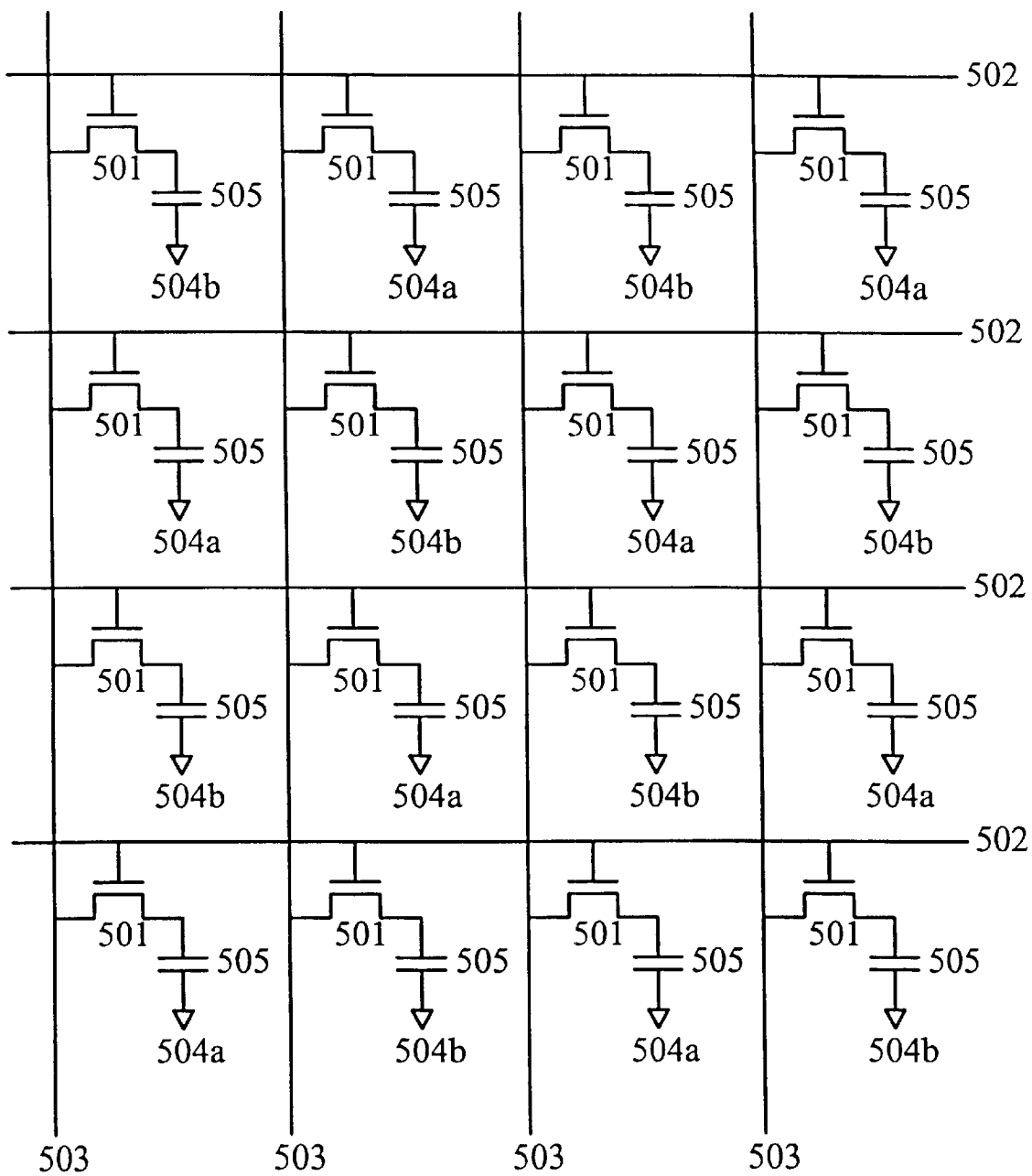
FIG. 4 is a diagram showing an equivalent circuit of the transistor array of the liquid crystal display according to the first embodiment of the invention.

FIG. 4 is a diagram showing an equivalent circuit of the transistor array of the liquid crystal display according to the first embodiment of the invention. The same symbols are used in FIG. 3 and FIG. 4.

The circuit comprises the transistors 501, the scan lines 502 connected to the gates of lines of the transistors 501, the data lines 503 connected to the sources of rows of the transistors 501, the common electrode 504a and 504b, and the capacitances 505 formed between the drains of the transistors 501 and the common electrodes 504a and 504b. The common electrodes 504a and 504b provide two different driving voltages. The two adjacent pixel regions have the common electrodes 504a and 504b and are driven by the two different voltages, respectively.

Figure 5:
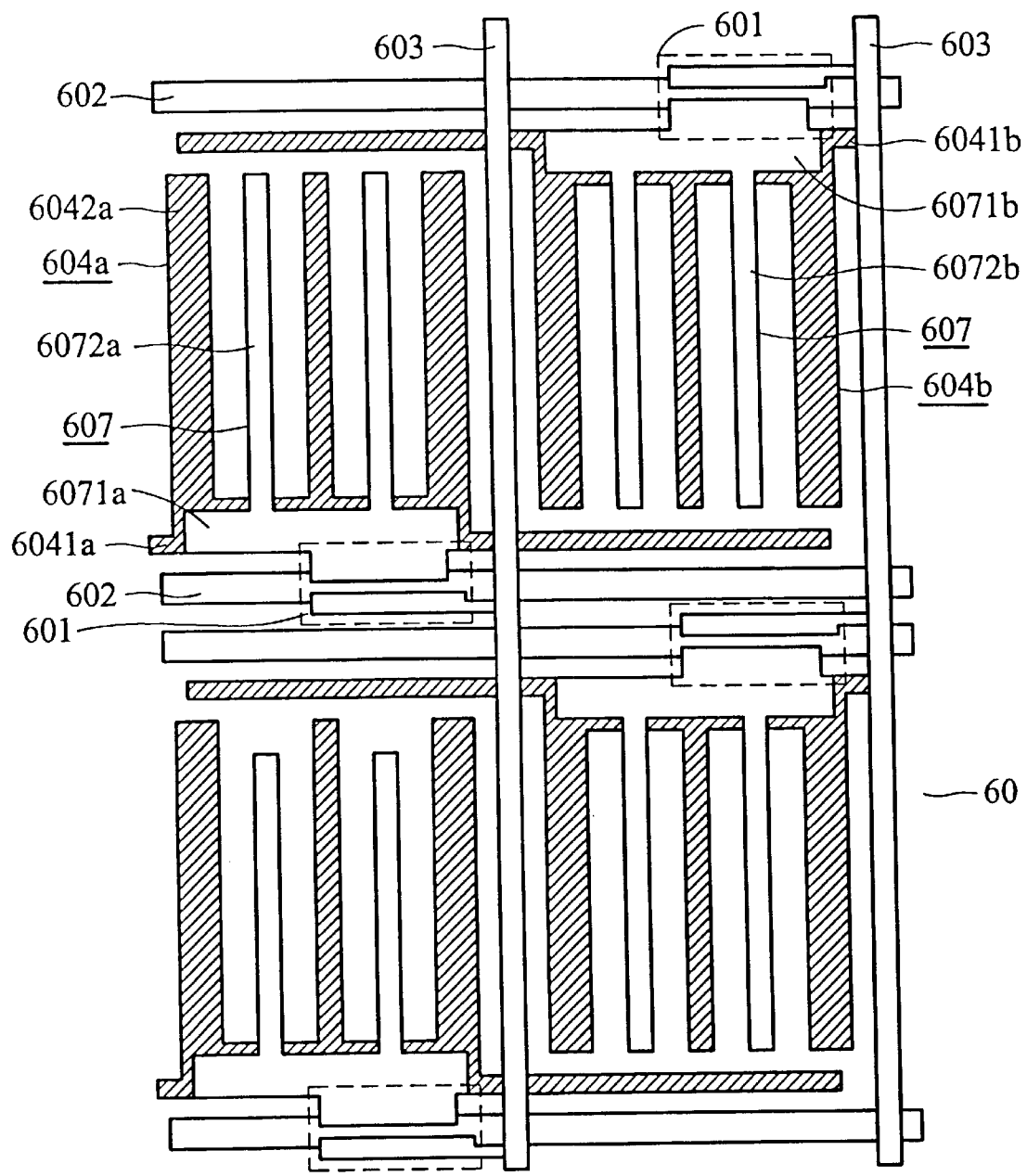
FIG. 5 is a diagram showing an array structure of a liquid crystal display according to a second embodiment of the invention.

FIG. 5 is a diagram showing an array structure of a liquid crystal display according to a second embodiment of the invention.

There are at least four pixel regions as a unit on a substrate 60. Each scan line 602 for two adjacent lines of pixel regions is electrically connected to gates of transistors 601 near the scan line 602 through via holes (not shown). Each data line 603 is electrically connected to sources of the transistors 601 in one row of pixel regions through via holes. Each pixel electrode 607 has a connector 6071 electrically connected to drains of the transistors 601 and extended portions 6072 extending from the connector 6071. Two common electrodes 604a and 604b isolated from each other are provided, and have connectors 6041a and 6041b, along with the lines of the pixel regions and extended portions 6042a and 6042b extending from the connectors 6041a and 6041b, respectively. The transistors 601 are positioned where the extended portions 6042a and 6042b extend from the connectors 6041a and 6041b of the common electrodes 604a and 604b. Capacitances are formed between the extended portions 6072, 6042a and 6042b respectively, of the pixel electrodes 607 and the common electrodes 604a and 604b.

Figure 6:
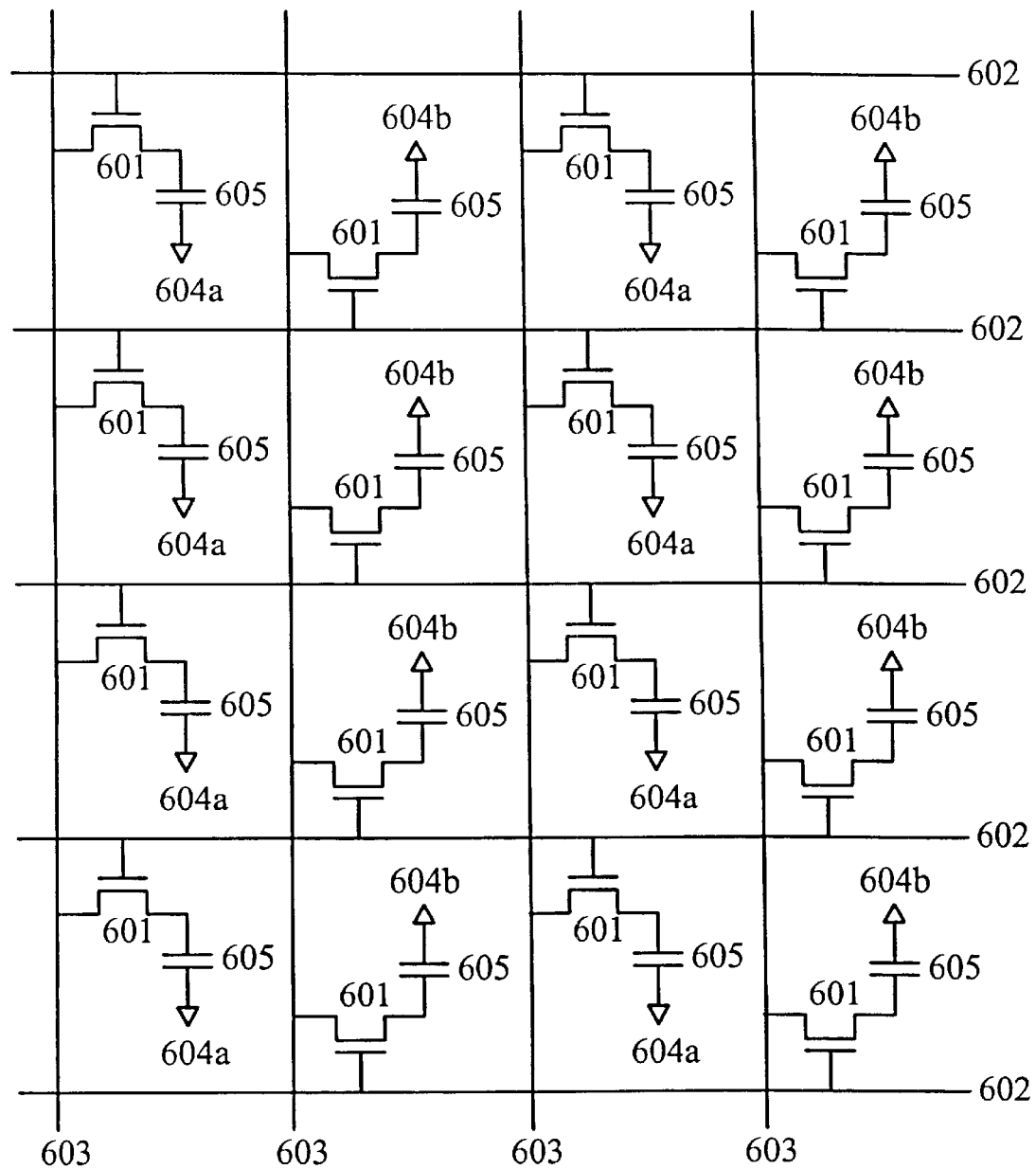
FIG. 6 is a diagram showing an equivalent circuit of the transistor array of the liquid crystal display according to the second embodiment of the invention.

FIG. 6 is a diagram showing an equivalent circuit of the transistor array of the liquid crystal display according to the second embodiment of the invention. The same symbols are used in FIG. 5 and FIG. 6.

The circuit comprises the transistors 601, the scan lines 602 between two adjacent lines of transistors 601, which is alternatively connected to the gates of the transistors 601 in the two adjacent lines, the data lines 603 connected to the sources of rows of the transistors 601, the common electrode 604a and 604b, and the capacitances 605 formed between the drains of the transistors 601 and the common electrodes 604a and 604b. The common electrodes 504a and 504b provide two different driving voltages. The two adjacent pixel regions have the common electrodes 604a and 604b and are driven by the two different voltages, respectively.

In the second embodiment, the connection of the scan lines to the transistor gates is different from that of a conventional liquid crystal display circuit so that the order of the scanned pixel regions is changed. An ordinary person skilled in the art can easily provide a new driving method for an LCD circuit configured in accordance with the second embodiment.

In conclusion, the present invention changes the structure of the common electrode to provide two common electrodes isolated from each other. Thus, it is possible for the pixel regions to have two different common electrode voltages having two different polarities.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An array structure of a liquid crystal display comprising:
   a substrate having a first and a second pixel region thereon, each of which comprises:
   a transistor;
   a pixel electrode electrically connected to a drain of the transistor; and
   a common electrode forming a capacitance with the pixel electrode;
   wherein the common electrodes of the first and second pixel regions are electrically isolated from each other.

2. The structure as claimed in claim 1 further comprising a scan line electrically connected to gates of the transistors of the pixel regions.

3. The structure as claimed in claim 2 wherein the scan line is electrically connected to the gates of the transistors through via holes.

4. The structure as claimed in claim 1 further comprising a first and a second data line respectively connected to sources of the transistors of the first and second pixel region.

5. The structure as claimed in claim 4 wherein the data lines are electrically connected to the sources of the transistors through via holes.

6. The structure as claimed in claim 1 wherein the pixel electrodes are electrically connected to the drains of the transistors through via holes.

7. The structure as claimed in claim 1 wherein the common electrodes provide two different driving voltages.

8. The structure as claimed in claim 7 wherein the two different driving voltages have different polarities.

9. An array structure of a liquid crystal display comprising:
   a substrate having a first and a second pixel region thereon, each of which comprises:
   a transistor;
   a pixel electrode electrically connected to a drain of the transistor; and
   a common electrode having an extended portion forming a capacitance with the pixel electrode and a connector from which the extended portion extends;
   wherein the common electrodes of the first and second pixel regions are isolated from each other, and the transistors are positioned where the extended portions extend from the connectors.

10. The structure as claimed in claim 9, further comprising at least a scan line electrically connected to gates of the transistors of the pixel regions.

11. The structure as claimed in claim 10 wherein the scan line is electrically connected to the gates of the transistors through via holes.

12. The structure as claimed in claim 9, further comprising a first and a second data line respectively connected to sources of the transistors of the first and second pixel region.

13. The structure as claimed in claim 12 wherein the data lines are electrically connected to the sources of the transistors through via holes.

14. The structure as claimed in claim 9 wherein the pixel electrodes are electrically connected to the drains of the transistors through via holes.

15. The structure as claimed in claim 9 wherein the common electrodes provide two different driving voltages.

16. The structure as claimed in claim 15 wherein the two different driving voltages have different polarities.

* * * * *